United States Patent

Yamada

[11] 3,894,777
[45] July 15, 1975

[54] BICYCLE WHEEL

[76] Inventor: Ryoichi Yamada, 10, 7-chome, Nishikikui-cho, Nagoya, Japan

[22] Filed: Feb. 15, 1974

[21] Appl. No.: 443,001

[30] Foreign Application Priority Data
Aug. 31, 1973 Japan............... 48-102812

[52] U.S. Cl............ 301/104; 301/37 SA; 40/129 B
[51] Int. Cl.............................................. B60b 7/00
[58] Field of Search............. 301/37 R, 37 SA, 104; 40/129 B

[56] References Cited
UNITED STATES PATENTS
1,597,225  8/1926  Wagenhorst................. 301/104
3,820,852  6/1974  Kennedy.................... 301/37 SA Primary Examiner—Lloyd L. King
Assistant Examiner—D. W. Keen
Attorney, Agent, or Firm—Stewart and Kolasch, Ltd.

[57] ABSTRACT

In a bicycle wheel incorporating a number of spokes radially extending between a bicycle wheel rim and a hub, at least one flattened portion is formed respectively with each of said spokes by pressing, and onto both sides of each of said flattened portions reflecting materials are respectively applied for recognition and ornamentation purposes.

7 Claims, 5 Drawing Figures 3,894,777

BICYCLE WHEEL

The present invention relates to a bicycle wheel, and more particularly to a bicycle wheel which has a number of spokes respectively provided with one or more of reflective flattened portions for safety and ornamentation purposes.

In order to secure safety in cycling after dark, it has hithertofore been proposed to amount prismatic lens or the like reflecting devices at the front and the rear portions of a bicycle for provision of recognition under illumination from the active head lamps of motor vehicles. However, such conventional equipments of the reflecting devices do not serve effectively when they are illuminated transversely with respect to the bicycle running direction since the front reflector is adapted to face forward while the rear one is adapted to face backward.

It is, however, likewise necessary to provide some side reflective means for permitting recognition from the direction traverse to the bicycle running direction. Because the bicycle headlight in the dark will be eliminated by the relatively far stronger headlight of the motor vehicle, and therefore a vehicle driver occasionally fails to have an eye upon a road crossing bicycle remotely ahead of him. It will be too late for the vehicle driver to recognize the bicycle within the range of required brake stopping distance.

It is, therefore, the principal object of the present invention to provide a novel bicycle wheel wherein each of spokes has at least one reflective flattened portion for permitting recognition from afar under illumination from luminescent sources.

The present invention also contemplates provision of dynamic ornamentation with the bicycle wheel which is developed during cycling. Therefore, it is another object of the present invention to provide a novel bicycle wheel having each of spokes designed so as to cooperatively develop ornamental effect during the wheel rotation.

And the further objects and novel features of the present invention will become more apparent from the following detailed description when the same is read in connection with the accompanying drawings. It is to be expressly understood, however, that the drawings are for the purpose of illustration only and are not intended as a definition of the limits of the invention.

Figure 1:
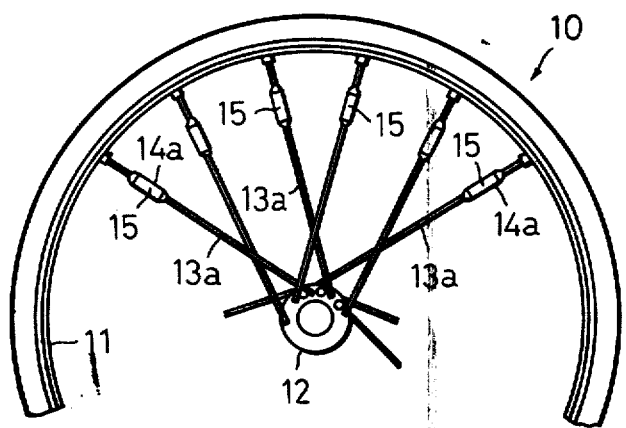
FIG. 1 is a somewhat diagrammatic fragmentary elevation of the bicycle wheel in accordance with the present invention.
Figure 2:
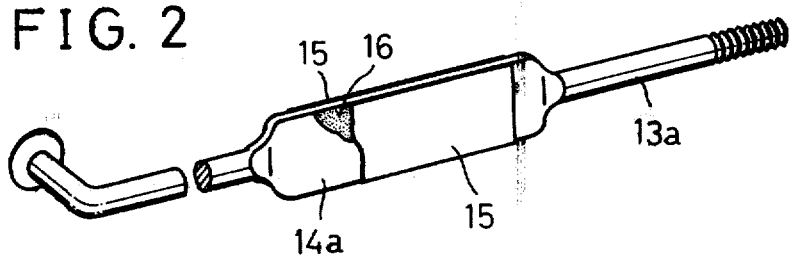
FIG. 2 is an enlarged perspective view with parts broken away, of a spoke incorporated with the bicycle wheel of FIG. 1.

Referring now in particular to the drawings, wherein like reference characters designate like or corresponding parts throughout, there is shown a bicycle wheel generally designated by reference numeral 10 which incorporates a number of spokes radially extending between a wheel rim 11 and a hub 12. In the first embodiment shown in particular in FIGS. 1 and 2, each of the spokes referred to as 13a has a substantially flattened portion 14a which is formed by pressing at equal distance from the wheel rim 11. On both sides of each of said flattened portions 14a reflecting materials 15 are attached or coated respectively. This reflecting material 15 per se is well known as luminous tape or paint, both being available in the market. In case the reflecting material is of tape type, it should be applied respectively onto the both sides of said flattened portion 14a by means of adhesive 16 as shown in FIG. 2. While, in case paint type of reflecting material is employed, it may be applied onto said flattened portion 14a by merely painting. It should be noted that the manner of applying the reflecting material 15 onto the flattened portion is the same as the modifications of the present invention to be described hereinafter.

While, in the forming of said flattened portions 14a by pressing, it will be easily understood that it should be avoided to form the portion too thin or otherwise the required mechanical strength at its portion 14a will be lost. Thus, it is preferable to prepare each of the spokes formed partially thicker at a position where said flattened portion 14a is to be formed. Further, it will also be easily understood that when luminous performance of said reflecting material 15 is deteriorated, it can be recovered without difficulty by merely replacing or re-painting.

In cycling after dark, said reflecting materials 15 applied onto each of said flattened portions 14a cooperate to look like an annular luminous ring under illumination as the wheel 10 rotates, attracting vehicle drivers' attention to the running bicycle for precaution. And the annular luminous ring thus presented also develops beautiful dynamic ornamental effect. This ornamental effect is likewise observed in the daytime.

Figure 3:
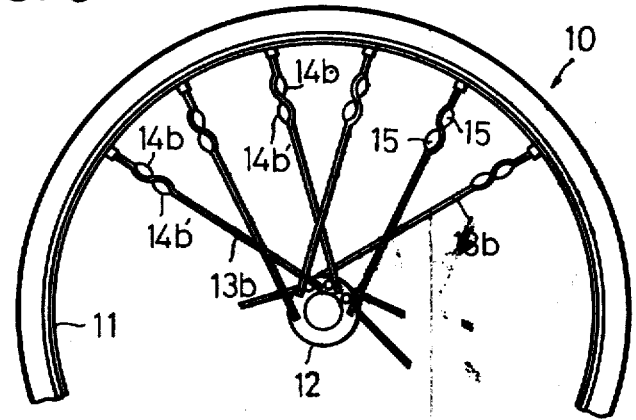
FIGS. 3 to 5 are similar views to FIG. 1, but showing modifications according to the present invention, respectively.

Referring now to the first modification of the present invention shown in FIG. 3, each of the spokes 13b is twisted at equal distance from the wheel rim 11, and adjacent to said twisted position a pair of flattened portions 14b, 14b' are formed by pressing. By twisting the spoke 13b as illustrated in FIG. 3, mechanical strength at said flattened portions 14b and 14b' can be retained. Onto both sides of each of said flattened portions 14b, 14b' the reflecting materials 15 described in the foregoing are applied respectively.

Figure 4:
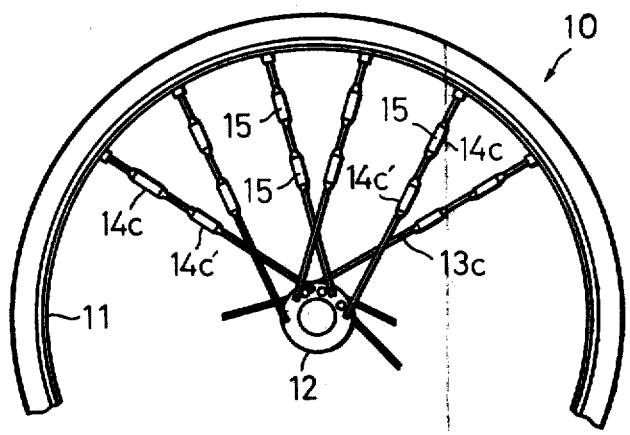

In the second modification of the invention shown in FIG. 4, each of the spokes 13c is provided at equal distance from the wheel rim 11 with a pair of flattened portions 14c and 14c', onto which said reflecting materials 15 are applied respectively.

In use of said first and second modifications shown in FIGS. 3 and 4, a pair of annular luminous rings are observed under illumination whereby vehicle drivers' recognition is more easily attained and ornamental effect is also promoted.

Figure 5:
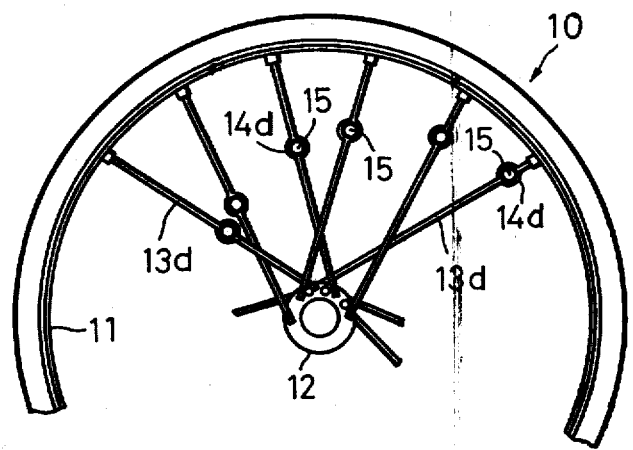

While, in the third modification as illustrated in FIG. 5, each of the spokes 13d is likewise formed with a flattened portion 14d, and said reflecting materials 15 are applied respectively thereonto as well. However, the position of each of the flattened portions 14d is arranged so as to vary gradually. Thus, in cycling, a number of annular luminous rings are observed as the wheel 10 rotates, developing more ornamental effect. Further, if different color is employed with respect to each of the flattened portions 14d, very colorful ornamentation is provided with the bicycle wheel 10 as it rotates, as well as the desired recognition by vehicle drivers.

While the invention has been particularly shown and described with reference to preferred embodiments thereof, it will be understood by those skilled in the art that the foregoing and other changes and modifications in forms and details can be made therein without departing from the spirit and scope of the invention.

I claim:

1. A bicycle wheel comprising
a number of spokes radially extending between a wheel rim and a hub,
at least one flattened portion formed with each of said spokes, and
reflecting material applied onto both sides of each of said flattened portions.

2. The bicycle wheel, as set forth in claim 1, wherein tape type of reflecting material is employed for application onto both sides of each of said flattened portions by adhesive.

3. The bicycle wheel, as set forth in claim 1, wherein paint type of reflecting material is employed for coating on both sides of each of said flattened portions by painting.

4. The bicycle wheel, as set forth in claim 1, wherein each of said spokes is formed with an integral flattened portion at equal distance from the wheel rim.

5. The bicycle wheel, as set forth in claim 1, wherein each of said spokes is formed with a pair of integral flattened portions spaced at equal interval.

6. The bicycle wheel, as set forth in claim 1, wherein each of said spokes is twisted at equal distance from the wheel rim, and
adjacent to both sides of said twisted position a pair of flattened portions are formed respectively.

7. The bicycle wheel, as set forth in claim 1, wherein each of said spokes is different in position where said flattened portion is formed.

* * * * *